Patented Oct. 2, 1945

2,385,970

UNITED STATES PATENT OFFICE 2,385,970

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application March 9, 1943, Serial No. 478,597

6 Claims. (Cl. 252—340)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under conditions just mentioned, is of significant value in removing impurities, particularly inorganic salts, from pipeline oil.

The demulsifier or demulsifying agent employed in our process consists of a fractional ester, i. e., an ester containing at least one free carboxylic radical, and containing radicals, or groups derived from the following reactants:

(a) A polybasic carboxy acid;

(b) A high molal detergent-forming monocarboxy acid;

(c) A member of the class consisting of oxyalkylated polyhydric phenols, di-(polyalkylene glycoxy) alkanes, in which the alkenyl radical is selected from the group consisting of the aliphatic alkenyl radicals containing from 8 to 18 carbon atoms; and the di-cyclohexenyl dialkyl methanes in which each alkyl radical contains preferably less than 10 carbon atoms; and (d) A polyhydric alcohol radical as a linking radical wherever required.

Although the cycloaliphatic compounds, i. e., cycloalkanes, are not necessarily the obvious equivalent of the acyclic alkanes, we have found that no differentiation need be employed in respect to the compositions herein contemplated. The word "alkane," unless indicated otherwise, will be employed in its broadest aspect to include acyclic alkanes and cycloalkanes. The preparation of such hydroxylated bodies for subsequent reaction with phthalic anhydride or the like is well known. For convenience, reference is made to U. S. Patent No. 2,240,472, dated April 29, 1941, to Swan. The subject-matter following immediately is in essentially verbatim form as it appears in said aforementioned Swan patent. Thus, one class of raw materials includes the di-(polyalkylene glycoxy) alkanes in which the alkenyl radical is selected from the group consisting of the aliphatic alkenyl radicals containing from 8 to 18 carbon atoms and the di-cyclohexenyl dialkyl methanes, in which each alkyl radical contains less than 3 carbon atoms, each polyalkylene glycoxy chain contains from 5 to 20 alkylene glycol radicals, and the alkylene radical is selected from the group consisting of ethylene and propylene.

The di-(polyalkylene glycoxy) alkanes, in which the alkenyl radical is an aliphatic alkenyl radical of from 8 to 18 carbon atoms, e. g., di-(polyethylene glycoxy) decane.

$HO.CH_2.CH_2.(O.CH_2.CH_2)_x.O.(CH_2)_{10}.$
$O.(CH_2.CH_2.O)_x.CH_2.CH_2.OH$ may be prepared in a manner similar to that shown in British Patent No. 443,559, by condensing ethylene oxide or propylene oxide with dihydric alcohols of from 8 to 18 carbon atoms, e. g., decamethylene glycol.

The di-(polyalkylene glycoxy) alkanes in which the alkenyl radical is a di-cyclohexenyl dialkyl methane, e. g., 4:4'-di-(polyethylene glycoxy-cyclohexyl) dimethyl methane

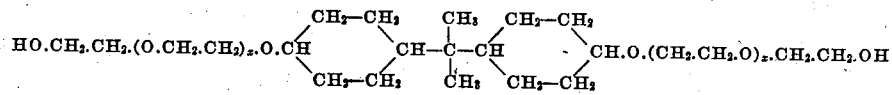

may be prepared as follows: Phenol is reacted with acetone (or diethyl ketone or methyl ethyl ketone) as described in U. S. Patent No. 1,225,748, of Wallace A. Beatty, to give the compound diphenylol dimethyl methane

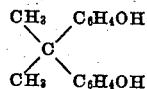

(or the corresponding diethyl or methyl ethyl compound). This compound is hydrogenated as described in British Patent No. 274,439, to give the corresponding dicyclohexylol dialkyl methane. This is then condensed with ethylene oxide or propylene oxide, in a manner similar to that shown in British Patent No. 443,559. Such compounds are mentioned in French Patent No. 772,302. It is to be noted, however, that the raw materials employed in the present instance for reaction with phthalic anhydride or the like, are not limited to those which are especially water-soluble, but include those of lesser water-solubility than the type described in the said Swan patent. For this reason, one is not limited to the use of ethylene oxide and propylene oxide as a reactant, but may employ other compounds having a reactive ethylene oxide ring.

As typical examples of applicable compounds may be mentioned glycerine epi-chlorhydrin, glycide, alcohol, ethylene oxide, propylene oxide, butene-2 oxide, butene-1 oxide, isobutylene oxide, butadiene oxide, butadiene di-oxide, chloroprene oxide, isoprene oxide, decene oxide, styrene oxide, cyclohexylene oxide, cyclopentene oxide, etc. In actual use we have found that one can obtain the cycloalkane derivatives more cheaply and more readily than the acyclic derivatives. In other words, straight chain or branched chain dihydric alcohols containing from 8 to 18 carbon atoms or thereabouts, are comparatively expensive, whereas, certain phenol-ketone condensation products, known generically in the art as "bis-phenols" are readily available and are comparatively inexpensive. As to the manufacture of bis-phenols, reference is made to U. S. Patent No. 2,182,308, dated December 5, 1939, to Britton and Bryner. Bis-phenols have the general formula:

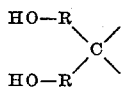

wherein R is an aryl group and the free bonds are linked with alkyl groups or an alkylene radical. They are commonly prepared by reacting a phenol, e. g., phenol, o-cresol, etc., with a ketone such as acetone, methyl-ethyl-ketone, dibenzyl ketone, cyclohexanone, etc., in the presence of a concentrated strong mineral acid such as sulfuric or hydrochloric acid. Any ketone, e. g., acetone, methyl ethyl ketone, diethyl ketone, dibutyl ketone, cyclohexanone, may be employed in the reaction and also a variety of phenols can be used; for instance, phenol, o-cresol, o-chlorphenol, etc., are suitable.

Similar reagents are derivable from a variety of other carbonyl-containing compounds, including ketones, in which the carbonyl oxygen is activated by the presence of a halogen as a substituent for a hydrogen atom, alpha chlorinated aldehydes, etc. In the art relating to this type of compound they are sometimes described as "substituted methanes"; other times as "substituted 2,2 propanes." Although there is extensive literature dealing with this type of compound, reference is made only to a few additional patents, to wit: British Patent No. 274,439, to Chemische Fabrik Auf Actien; to British Patent No. 254,753, referred to previously, and British Patent No. 443,559 to I. G. Farbenindustrie, A. G. Alcohols obtained from ricinoleic acid, hydroxylated ricinoleic acid, etc., in which the two hydroxyl radicals are separated by at least 8 carbon atoms, are also satisfactory as reactants of the acyclic type. It is to be noted that such glycols are treated with oxyalkylating agents in the manner described in the treatment of cetyl alcohol, in Example 1 of the aforementioned British Patent No. 443,559.

Although it is not believed that a further description is required in respect to glycols or hydroxylated compounds employed as reactants, the following may be included by way of illustration: It may be well to emphasize that when glycide or the equivalent is employed, either alone or in combination with ethylene oxide, one may obtain a reactant which contains more than two alcoholic hydroxyls, and thus, in the strictest sense of the word, is not a glycol, but is conveniently included in the present instance and is contemplated within the scope of the hereto attached claims.

*Hydrophile hydroxylated alkanes, Example 1*

1 pound mole of decamethylene glycol is condensed with 6 moles of ethylene oxide.

*Hydrophile hydroxylated alkanes, Example 2*

The same procedure is followed, except that 12 moles of ethylene oxide are employed.

*Hydrophile hydroxylated alkanes, Example 3*

The same procedure is followed, except that 18 moles of ethylene oxide are employed.

*Hydrophile hydroxylated alkanes, Example 4*

The same procedure is followed, except that 24 moles of ethylene oxide are employed.

*Hydrophile hydroxylated alkanes, Example 5*

The same procedure is followed as in Examples 1 to 4, preceding, except that ricinoleyl alcohol, di(hydroxy)octadecene, is substituted for decamethylene glycol, in the preceding example.

*Hydrophile hydroxylated alkanes, Example 6*

The alcohol derived from hydrogenated castor oil, a hydroxystearic acid glyceride, and sometimes referred to as di(hydroxy)octadecane, is substituted for decamethylene glycol, in the preceding Examples 1 to 4.

*Hydrophile hydroxylated alkanes, Example 7*

Di-cyclohexylol propane is prepared in the customary manner by the hydrogenation of dimethyl diphenylol methane. This product is sold commercially as Bis Phenol-A. The compound is also known as p,p'-dihydroxy diphenyl dimethyl methane, or as p,p'-isopropylidene bisphenol, and has the following composition:

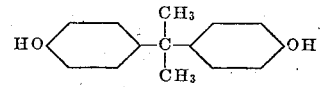

Needless to say, the same procedure for producing glycol or polyglycol ethers of polyhydric alcohols applies with equal force and effect to the polyhydric phenols. The manufacture of these compounds is well known, and for a complete description see British Patent No. 470,181, to I. G. Farbenindustrie, A. G. Attention is called particularly to certain suitable phenolic raw materials mentioned in said aforementioned British patent. Such polyhydric phenols include isononyl resorcinols. Note, particularly, Example 14 of said British patent, which is concerned with oxyethylated iso-octyl resorcinol. Due to its availability, we particularly prefer compounds obtained by treating 4-tert-butyl catechol (4-tert butyl-1,2-dihydroxy-benzene) with low molal alkylating agents, such as ethylene oxide, propylene oxide, butylene oxide, glycide, etc.

Furthermore, it is obvious that any of the phenol-ketone condensation products, or similar monomeric phenol-aldehyde condensation products of the kind previously decsribed, may be employed. We particularly prefer to use any of the "bis-phenols" described generically in the aforementioned Britton and Brynar Patent No. 2,182,-308, dated December 5, 1939.

*Hydrophile hydroxylated polyhydric phenols, Example 1*

1 pound mole of mixed isononyl resorcinols is treated with 6 moles of ethylene oxide. (See aforementioned British Patent No. 470,181.)

*Hydrophile hydroxylated polyhydric phenols, Example 2*

1 pound mole of iso-octyl resorcinol is treated with 6 moles of ethylene oxide. (Example 14 of aforementioned British Patent No. 470,181.)

*Hydrophile hydroxylated polyhydric phenols, Example 3*

1 pound mole of 4-tert-butyl catechol is treated with 6 moles of ethylene oxide.

*Hydrophile hydroxylated polyhydric phenols, Example 4*

1 pound mole of (dihydroxy phenyl)-dimethyl-methane is treated with 6 moles of ethylene oxide.

*Hydrophile hydroxylated polyhydric phenols, Example 5*

1 pound mole of di(4-hydroxy toluyl)-dimethyl-methane, obtained from acetone and ortho cresol instead of acetone and phenol, is treated with 6 pound moles of ethylene oxide.

*Hydrophile hydroxylated polyhydric phenols, Example 6*

The same procedure is followed as in Examples 1 to 5, preceding, except that 12 moles of ethylene oxide are employed instead of 6 moles.

*Hydrophile hydroxylated polyhydric phenols, Example 7*

The same procedure is followed as in Examples 1 to 5, preceding, except that 18 moles of ethylene oxide instead of 6 moles of ethylene oxide are employed.

*Hydrophile hydroxylated polyhydric phenols, Example 8*

The same procedure is followed as in Examples 1 to 7, preceding, except that propylene oxide, butylene oxide, or glycide is substituted for ethylene oxide.

A variety of polybasic carboxy acids, or their equivalents, such as the anhydrides, esters, or acyl chlorides, may be employed. Among various available polybasic carboxy acids suitable for use as reactants, are citric acid, tartaric acid, oxalic acid, phthalic acid, maleic acid, malic acid, succinic acid, adipic acid, azaleic acid, fumaric acid, citraconic acid, etc. We particularly prefer to use the dibasic acids. It is to be noted that numerous examples are available as anhydrides, rather than acid. Reference is made specifically to phthalic anhydride, maleic anhydride, citraconic anhydride, etc.

The detergent-forming monocarboxy acids containing at least 8 and not more than 32 carbon atoms, are characterized by the fact that they combine with alkalies to produce soap or soap-like materials. These detergent-forming acids include fatty acids, resin acids, petroleum acids, etc. For the sake of convenience, these acids will be indicated by the formula R.COOH.

Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids. Instead of naphthenic acids, one might employ brominated naphthenic acids, etc. Acids obtained by the oxidation of petroleum fractions or waxes may be employed. This type of acid may also be subjected to various modifications, provided such modifications still retain detergent-forming properties.

A description of polyhydric alcohols is not necessary, since they represent a common class of chemical compounds. It is to be noted, however, that polyhydric alcohols are understood to include the ether type, such as diethylene glycol, triethylene glycol, tetraethylene glycol, etc., as well as cyclic and acyclic polyglycerols, including di-glycerol, tri-glycerol, etc. Common examples include glycerol ethylene glycol, propylene glycol, etc.

In contemplating suitable procedures for forming the acidic esters herein contemplated, it is to be noted that a detergent-forming monocarboxy acid radical must be present. Such detergent-forming monocarboxy acid compound may or may not have a hydroxyl radical present. For instance, ricinoleic acid, hydroxystearic acid, dihydroxystearic acid, and the like, would have an alcoholic hydroxyl group present as part of the higher fatty acid acyl radical. This would not be true if oleic acid, stearic acid, linoleic acid, naphthenic acid, or the like, were employed. On the other hand, one could employ mono-olein, di-olein, mono-stearin, di-stearin, mono-naphthenin, di-naphthenin, etc. Likewise, one may employ a material, such as mono-ricinolein, di-ricinolein, and the like. Furthermore, in addition to employing such materials as ricinoleic acid, one may employ ethyl ricinoleate, ethylene glycol ricinoleate, tri-ricinoleate, etc.

Having prepared the polyglycol ethers of various polyhydroxylated alkanes and polyhydric phenols, as previously described, a convenient second step in the preparation of the new composition of matter is to produce acid esters of the kind obtainable between polybasic carboxy acids, or their functional equivalents, such as the anhydrides, and hydroxylated fatty acids, esters, or the like.

Reference is made to the following examples which are indicated by structural formulas and described in detail in U. S. Patent No. 2,166,432, dated July 18, 1939, to De Groote:

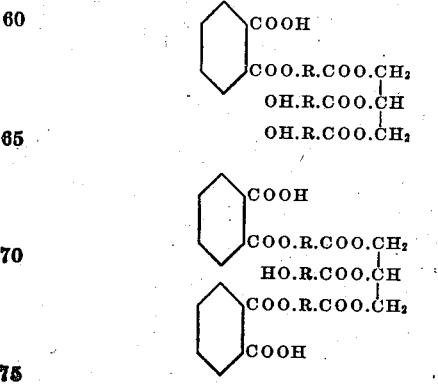

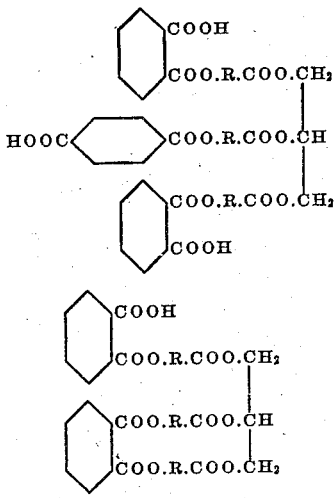

Furthermore, note additional examples described in detail in U. S. Patent No. 2,166,433, dated July 18, 1939, to De Groote. Among the various examples are the following:

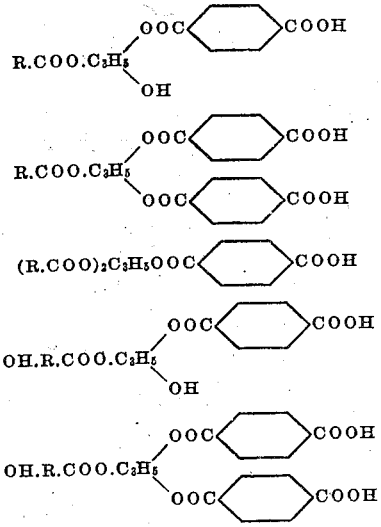

The previous examples exemplifying certain polycarboxylic reactants have been limited to the type in which phthalic anhydride was employed. Previously attention has been directed to the fact that numerous other polybasic acids or anhydrides, particularly maleic anhydride, adipic acid, citraconic acid, azaleic acid, sebacic acid, succinic acid, etc., might be employed just as advantageously.

*Polybasic reactants, Example 1*

Polyphthalated triricinolein is prepared in the manner described in U. S. Patent No. 1,976,602, dated October 9, 1934, to De Groote et al. (See page 4, lines 15 et seq.)

*Polybasic reactants, Example 2*

Commercial diricinolein is treated with two moles of phthalic anhydride, so as to yield an ester having two free carboxyl radicals. This is a conventional esterification reaction, and the materials are intimately mixed and heated at approximately 120–160° C., with constant agitation, until samples taken from the batch and analyzed show substantially complete reaction. A suitable solvent may be present, and water formed may be distilled off continuously during the esterification process. The solvent may remain behind in the final product, or be removed, if desired.

*Polybasic reactants, Example 3*

Diphthalated mono-olein is prepared in a manner similar to the procedure employed in preparing diphthalated diricinolein in Example 2, immediately preceding.

*Polybasic reactants, Example 4*

Dimaleated monostearin is prepared in a manner similar to that employed in the preceding examples.

*Polybasic reactants, Example 5*

Dioxalated monoabietin is prepared in a manner similar to that employed in the preceding examples.

*Polybasic reactants, Example 6*

Dicitrated mononaphthenin is prepared in a manner similar to that employed in the preceding examples.

*Polybasic reactants, Example 7*

1 mole of ricinoleic acid is reacted with 1 mole of phthalic anhydride.

*Polybasic reactants, Example 8*

1 mole of butyl ricinoleate is reacted with 1 mole of phthalic anhydride.

*Final composition of matter, Example 1*

1 pound mole of a hydroxylated alkane, such as exemplified by Hydrophile hydroxylated alkanes, Examples 1 to 7, inclusive, is reacted with 1 mole of diphthalated triricinolein, so as to give a sub-resinous material in which there is present at least one unreacted carboxyl radical. The diphthalated triricinolein is, in turn, obtained by reaction between 1 mole of triricinolein and two moles of phthalic anhydride in the manner previously described. The esterification reactions are conducted in the usual manner (see, for example, U. S. Patent No. 2,166,433, aforementioned, page 6, right hand column, line 33.)

*Final composition of matter, Example 2*

A hydrophile hydroxylated polyhydric phenol, as exemplified by Hydrophile hydroxylated polyhydric phenols, Examples 1 to 8, inclusive, are substituted for the hydrophile hydroxylated alkanes employed in the preceding example.

*Final composition of matter, Example 3*

The same procedure is followed as in Examples 1 and 2, preceding, except that materials of the kind exemplified by Polybasic reactants, Examples 2 to 6, inclusive, are substituted for polyphthalated triricinolein.

*Final composition of matter, Example 4*

The same procedure is followed as in the previous examples, except that polybasic reactants, Example 7 or 8, are employed, followed by subsequent reaction with an additional mole of phthalic anhydride, or some other polybasic acid.

Attention is directed to what is perfectly obvious, in view of what has been said previously, that an alternate method of obtaining the preceding examples or kindred types, employs reacting a polyglycol ether with the polybasic acid, and then adding a selected detergent-forming material, such as ricinoleic acid, methyl ricinoleate, triricinolein, mono-olein, or the like.

Similarly, a somewhat different type is available by esterifying the polyglycol ether with the detergent-forming acid, and then reacting with the polybasic acid. Obviously, if all of the hydroxyls of the polyglycol ether are esterified with a detergent-forming monocarboxy acid, then at least one such high molal acyl radical must contain a hydroxyl group. In other words, one should employ a material of the type exemplified by ricinoleic acid, hydroxystearic acid, or the like. This then permits subsequent reaction with a polybasic acid, such as phthalic anhydride, or the like. If, however, the polyglycol ether is esterified with oleic acid, naphthenic acid, oxidized petroleum acid, or abietic acid, then at least, one unreacted hydroxyl group must be available for subsequent reaction with phthalic anhydride, or the like. In this connection, attention is directed particularly to completion of the oxyalkylation reaction by means of glycid. For instance, where previous directions have called for the use of 6 moles, or 12 moles, or 18 moles of ethylene oxide, it would be desirable to use somewhat less. For instance, 4 moles, or 10 moles, or 16 moles, and then complete the oxyethylation by means of 2 moles of glycid.

We have found that the most suitable products for various purposes, and particularly, for demulsification, are sub-resinous, semi-resinous, or balsaam-like products, and are preferably derived from polyfunctional acylated reactants, in which the acyl group is derived from a high molal detergent-forming monocarboxy acid. We have found that such products are soluble to a fairly definite state, for example, 5% in some solvent, such as water, alcohol, benzene, dichloroethyl ether, acetone, cresylic acid, dilute acidic acid, dioxane, or the like. This is simply another way of stating that it is preferable, that the product be one of the sub-resins, which are commonly referred to as an A resin, or a B resin, as distinguished from a C resin, which is highly infusible, insoluble resin. (See Ellis, Chemistry of Synthetic Resins, 1935, page 862, et seq.)

The hydroxylated products, or acylated hydroxylated products, or the like, may be considered as an alcohol, i. e., a monohydric or polyhydric alcohol. If an alcohol is indicated by the formula Y'(OH)$_n$, where $n$ indicates the number 1, or more, and if a polybasic acid body be indicated by the formula X'(COOH)$_n$, where $n$ indicates the number 2, or more, then the reaction between a monohydric alcohol and a polybasic acid will result in a compound which may be indicated by the following formula:

YX(COOH)$_{n'}$ wherein $n'$ indicates the number 1, or more, and which is in reality a contraction of a more elaborate structural formula, in which X' and Y' are  joined by a carboxyl radical or residue. Assuming, however, as would be true in the majority of cases, that the alcohol actually would be a polyhydric alcohol, and that the acid body would be polybasic in nature, for instance, if one employed a diphthalate of a polyhydroxylated ether or the like of the kind previously described, then examination reveals that the formula might result in a combination, in which there were neither residual carboxyl radicals, nor residual hydroxyl radicals, or might result in compounds in which there were residual hydroxyl radicals, and no residual carboxyl radicals, or compounds where there might be residual carboxyl radicals and no residual hydroxyl radicals; or there might be both. This is indicated by the following:

(Y.X)$_q$(OH)$_{n'}$ (Y.X)$_q$(COOH)$_{m'}$ (OH)$_{n''}$(YX)$_q$(COOH)$_{m''}$ in which $q$ indicates a small whole number (one in the case of a monomer, and probably not over 10, and usually less than 5, and $m'$ and $n'$ indicate the number 1 or more, and $m''$ and $n''$ indicate zero or a small or moderately sized whole number, such as zero, one, or more, but in any event, probably a number not in excess of 4-8.

Conventional demulsifying agents employed in the treatment of oil field emulsions are used as such, or after dilution with any suitable solvent, such as water; petroleum hydrocarbons, such as gasoline, kerosene, stove oil; a coil tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellantous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned, but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said well fluids. This particular type of application is decidedly feasible when the demulsifier is used in connection with acidification of calcareous oil-bearing strata, especially if suspended in or dissolved in the acid employed for acidification.

The words "acidyl" and "acyl" and the words "acidylation" and "acylation" are usually used synonymously. Compounds of the type herein contemplated, and particularly for use as demulsifiers, are characterized by having two different types of carboxylic acid radicals, or carboxylic acyl radicals present. One type is derived from high molal detergent-forming monocarboxy acids, such as higher fatty acids, and the other type is derived from polybasic acids, particularly phthalic acid, and the like, or other suitable derivatives thereof, such as diethyl phthalate. For purpose of clarity, in the hereto attached claims, the use of the words "acyl," "acylated" and "acylation" is limited to high molal monocarboxy detergent-forming acids, whereas, the expressions "acidyl," "acidylated" and "acidylation" are used in connection with polybasic carboxy acids.

Having thus described our invention, what we claim as new and desire to secure by Letters Patent is:

1. A process for breaking petroleum emulsions of the water-in-oil type, which consists in subjecting the emulsion to the action of a demulsifier, comprising a sub-resinous member of the class consisting of acidylated esters of an acylated polyglycol ether and acylated esters of acidylated polyglycol ethers; said ester containing (a) at least 1 polycarboxy acid radical; (b) at least one high molal detergent-forming monocarboxy acid radical having at least 8 and not over 32 carbon atoms; and (c) at least one member of the class consisting of oxyalkylated polyhydric phenolic radicals and di(polyalkylene glycoxy) alkanes, in which the central divalent aliphatic radical in turn is selected from the group consisting of the aliphatic divalent alkylene radicals containing from 8 to 18 carbon atoms and the di-cyclohexenyl dialkyl methanes in which each alkyl radical contains less than 3 carbon atoms, and each polyalkylene glycoxy chain contains from 5 to 20 alkylene glycol radicals; said ester having at least one free carboxyl radical.

2. The process of claim 1, wherein the high molal detergent-forming monocarboxy acid radical is a higher fatty acid radical.

3. The process of claim 1, wherein the high molal detergent-forming monocarboxy acid radical is a higher fatty acid radical having 18 carbon atoms.

4. The process of claim 1, wherein the high molal detergent-forming monocarboxy acid radical is a higher unsaturated fatty acid radical having 18 carbon atoms.

5. The process of claim 1, wherein the high molal detergent-forming monocarboxy acid radical is a ricinoleic acid radical.

6. The process of claim 1, wherein the high molal detergent-forming monocarboxy acid is a ricinoleic acid radical, which radical in turn is part of a triricinolein group and in which a polycarboxy acid radical links said triricinolein group to the polyglycol ether radical.

MELVIN DE GROOTE.
BERNHARD KEISER.